United States Patent [19]

Turkdogan

[11] 4,370,161
[45] Jan. 25, 1983

[54] ORE REDUCTION USING CALCIUM OXIDE DESULFURIZATION

[75] Inventor: Ethem T. Turkdogan, Pittsburgh, Pa.

[73] Assignee: United States Steel Corporation, Pittsburgh, Pa.

[21] Appl. No.: 261,397

[22] Filed: May 7, 1981

Related U.S. Application Data

[63] Continuation-in-part of Ser. No. 154,731, May 29, 1980.

[51] Int. Cl.$^3$ .................... C21B 13/00; C21B 15/00; C01B 17/00
[52] U.S. Cl. ........................................ 75/34; 423/244; 423/164; 423/563; 423/638; 423/230
[58] Field of Search .............. 423/242 A, 242 R, 243, 423/244 A, 244 R, 230, 432, 563, 164, 638; 252/373; 75/33, 34, 35

[56] References Cited

U.S. PATENT DOCUMENTS 1,580,452  4/1926  Sperr .................................... 423/563
3,443,890  5/1969  Sisson et al. ........................ 423/432

FOREIGN PATENT DOCUMENTS 7605870  10/1976  France ........................................ 75/9
38801  of 1888  United Kingdom ................ 423/166

Primary Examiner—O. R. Vertiz
Assistant Examiner—Gregory A. Heller
Attorney, Agent, or Firm—W. Gary Goodson

[57] ABSTRACT

A process and apparatus for producing a low sulfur content hot reducing gas by desulfurizing hot reducing gas by contacting the sulfur-bearing hot reducing gas or carbonaceous material with a particulate calcium oxide desulfurizing agent to thereby produce a product gas stream and a byproduct calcium sulfide composition, and then recovering sulfur from the calcium sulfide composition by contacting the calcium sulfide composition with hot liquid water at a temperature and corresponding pressure sufficient to maintain steam in the system and wherein a major portion of the calcium sulfide composition has a particle size of less than about 6 mesh to thereby convert the sulfide to calcium hydroxide and hydrogen sulfide. A preferred process uses this low sulfur content gas to reduce iron ore, and especially wherein ore, calcium oxide and carbonaceous material are reacted in a shaft furnace.

12 Claims, 3 Drawing Figures

ORE REDUCTION USING CALCIUM OXIDE DESULFURIZATION

This application is a continuation-in-part of our co-pending application, Ser. No. 154,731, filed May 29, 1980.

BACKGROUND OF THE INVENTION

This invention relates to a process and apparatus for producing low sulfur content hot reducing gas and especially that gas formed by the combustion and gasification of sulfur-bearing carbonaceous fuel. The gasification of solid carbonaceous fuel, such as by reaction with a limited quantity of oxygen to produce carbon monoxide, is well known. Either pure oxygen or air, with or without steam, may be utilized in the reaction. The products of combustion are reducing gases including carbon monoxide and usually hydrogen. Carbon dioxide, water vapor and nitrogen may also be present in the reducing gas. Hydrogen is produced from the hydrocarbons in the fuel, and also by reaction of injected steam with carbon, while nitrogen may be brought in by air or may also be contained in the fuel. Carbon dioxide and water vapor may also be used in addition to react with the carbonaceous fuel and the reducing gas produced therefrom a vary the final composition of the product reducing gas.

One of the serious problems with gasification of carbonaceous fuels is that many commercially available carbonaceous fuels contain sulfur. Sulfur-containing reducing gases, usually predominantly hydrogen sulfide, are produced when these fuels are reacted with air or oxygen in a gasification process. These sulfur-containing gases in the reducing gas are often objectionable for a number of reasons. One of the chief reasons is, of course, that when the sulfur finally ends up in the air, it results in serious air pollution problems. Additionally, this sulfur should be removed from the product gas before its use in many applications, such as metallurgical reducing gas, synthesis gas, or feed stock for pipeline gas. Also, if the product gas is burnt to raise steam or generate electricity, it is advantageous to remove the $H_2S$ before combustion rather than having to remove $SO_2$ from the larger volume of combusted gas. In at least two of these applications, i.e. as a reducing gas for direct reduction of iron ore or fuel for gas-turbine engines, it is desirable to remove the $H_2S$ while the product gas is still hot so that the gas can be used directly without loss of heat values.

In order to balance, if only partly, the cost of desulfurizing the hot reducing gases, the byproducts of sulfur removal should be marketable: (i) recovery of sulfur from the spent absorbent, (ii) regeneration of absorbent for recycle, or (iii) marketing the treated spent absorbent, after the recovery of sulfur, for other applications. The absorbent used for desulfurization of hot reducing gases should have the capability of lowering the sulfur content of the treated gas to levels below 100 ppm without much changing the reducing capacity, hence fuel value, of the gas.

Attempts have been made to remove the sulfur during the gasification reaction itself. U.S. Pat. No. 3,533,730, incorporated herein by reference, is an example of such a process whereby the carbonaceous fuel is reacted with a controlled quantity of oxygen beneath the surface of a molten iron bath and whereby lime on the surface of the molten iron bath is used to desorb sulfur from the iron bath. Sulfur is then recovered from the coal ash-lime-sulfur molten slag byproduct. These are, however, serious questions concerning the practical operability of this process. The rate of coal gasification depends upon the rate of coal dissolution for a given melt size. Furthermore, the sulfur in the slag byproduct is recovered only by costly additional steps. The gasification product generally contains fly ash which also requires an extra step for removal.

The use of calcined dolomite has been suggested for a regenerative cycle process of desulfurization of hot reducing gases. See U.S. Pat. Nos. 3,276,203; 3,296,775; 3,307,350; 3,402,998; and 3,853,538, each incorporated herein by reference. While dolomite is an effective gas-desulfurizing agent, the most commonly proposed method of regenerating dolomite, reacting with $CO_2$ and $H_2O$ under slightly reducing conditions at pressures greater than about 50 psig and temperatures preferably about 1000°–1200° F. to liberate $H_2S$, does not achieve complete regeneration of the dolomite. One of the problems is that calcium carbonate formed in the regeneration coats the regenerated dolomite, thereby reducing its effectiveness. Furthermore, because the spent dolomite contains appreciable nonregenerated calcium sulfide, it must undergo expensive and complete treatment to bring it to a state suitable for disposal without causing pollution of the air and groundwater. When dolomite is calcined after having been regenerated by the above suggested process, some of the residual sulfur in the dolomite can be released, which requires difficult treatment to bring the stack gas to a condition suitable for venting to the atmosphere.

The use of porous manganese oxide pellets has been disclosed for use in another regenerative cycle process for desulfurizing hot reducing gas. See U.S. Pat. No. 4,164,544, incorporated herein by reference. The system of this patent is even more efficient than the dolomite system and has the ability to regenerate the spent manganese oxide pellet and reuse it many times without loss of reactivity.

However, in both the dolomite and manganese oxide systems described above the presence of fly ash in the reducing gas seriously interferes with the ability to regenerate the spent reactant. Since fly ash is generally present in reducing gases produced by gasification of coal or other carbonaceous material, this is a serious problem.

In the coal gasification process described in U.S. Pat. No. 3,625,164, incorporated herein by reference, crushed limestone is mixed with coal and gasification by partial combustion takes place in a fluidized bed. The calcium oxide of the limestone acts as a desulfurizing agent in the process. The resulting calcium sulfide together with coal ash produced as byproducts in the process are discharged from the gasification zone by a moving grate. One of the methods for recovering elemental sulfur from the calcium sulfide is to quench the hot solid byproducts from the gasification zone in a body of water maintained at atmospheric conditions. Under these conditions, $H_2S$ and water vapor are released and calcium hydroxide and inerts are recovered as solids. However, this process of sulfur removal is generally very sluggish and incomplete such that the ash residue still contains considerable sulfur and presents a serious disposal problem.

SUMMARY OF THE INVENTION AND BRIEF DESCRIPTION OF THE DRAWINGS

This invention relates to an improved process and apparatus for producing a low sulfur content hot reducing gas comprising (a) contacting a sulfur-bearing hot reducing gas or carbonaceous material with a desulfurizing agent comprising a bed of solid particles comprising calcium oxide to thereby produce low sulfur content hot reducing gas stream and a calcium sulfide composition, then (b) contacting the calcium sulfide composition with hot liquid water at a temperature and corresponding pressure sufficient to maintain steam in the system and wherein a major portion of the calcium sulfide composition has a particle size of less than about 6 mesh to thereby convert the sulfide of the composition to calcium hydroxide and hydrogen sulfide. In a preferred process, a hot reducing gas containing hydrogen sulfide is contacted with a desulfurizing agent comprising a bed of solid particles comprising calcium oxide at a temperature between about 500° C. and about 1300° C. Prior to or during the step of contacting the calcium sulfide composition with hot liquid water, it is necessary to reduce the particle size of the calcium sulfide composition. Preferably, this is conducted under water in order to eliminate any special problems with the hydrogen sulfide gas which might be produced upon contact of the reduced size calcium sulfide particles to moisture in the air. Preferably, the step of removing the sulfur from the calcium sulfide composition is conducted at elevated pressures. A preferred process uses this low sulfur content gas to reduce iron ore, and especially wherein ore, calcium oxide and carbonaceous material are reacted in a shaft furnace.

Applicant's process has the advantage of significantly improved speed of removal of the sulfur from the calcium sulfide composition. Additionally, it is possible to obtain substantially complete removal of the sulfur from the calcium sulfide composition in the form of hydrogen sulfide. The hydrogen sulfide can readily be marketed as such or converted to elemental sulfur, which is readily marketable. On the other hand, the finely divided calcium hydroxide composition is of sufficient purity to be readily marketable as a fertilizer, as a desulfurizing agent for stack gases, or the like. While it is possible to recycle the calcium hydroxide for use in desulfurizing hot reducing gases, it is generally not practical due to the decreased efficiency of the composition when used in such a process. An additional advantage of a simple one-time use for the dolomite is that significant capital expenditures are eliminated that would be required in a process involving recycle of the spent dolomite. A further significant advantage of this process is that it eliminates the fly-ash problem, since the fly-ash is filtered out by the bed of calcium oxide particles and fly-ash ends up as part of the final calcium hydroxide product.

DESCRIPTION OF THE PREFERRED EMBODIMENTS

The desulfurizing agent comprising a bed of solid particles comprise calcium oxide preferably in the form of calcined dolomite or lime. The particle size of this bed is preferably between about 1/8 inch and about 1 inch, and more preferably between about 1/4 inch and about 1/2 inch. If the particle size is below about 1/8 inch, there is a serious dust problem, and if the particle size is above about 1 inch, the efficiency of the desulfurization decreases markedly.

The calcium sulfide composition produced as a result of the desulfurizing step of this invention is composed of calcium sulfide and fly-ash and/or coal-ash depending upon whether the initial desulfurization is conducted by contacting coal with the desulfurizing agent or just the hot reducing gas. When dolomite is utilized as the desulfurizing agent, the calcium sulfide composition will also contain magnesium oxide.

The desulfurization step is preferably conducted at temperatures between about 500° C. and about 1300° C. and more preferably between about 800° C. and about 900° C.

The hot liquid water used to react with the calcium sulfide composition is preferably in the form of boiling water, although wet steam is also acceptable. The temperature of this reaction is preferably between about 100° C. and about 394° C., and more preferably between about 150° C. and about 250° C. and the pressure is preferably between about 1 and about 218 atmospheres, and more preferably at elevated pressures such as between about 5 to about 40 atmospheres.

The calcium sulfide composition produced in the desulfurization is reduced in particle size to less than about 6 mesh and preferably less than about 30 mesh immediately prior to or during the process of contacting this composition with the hot liquid water.

Figure 1:
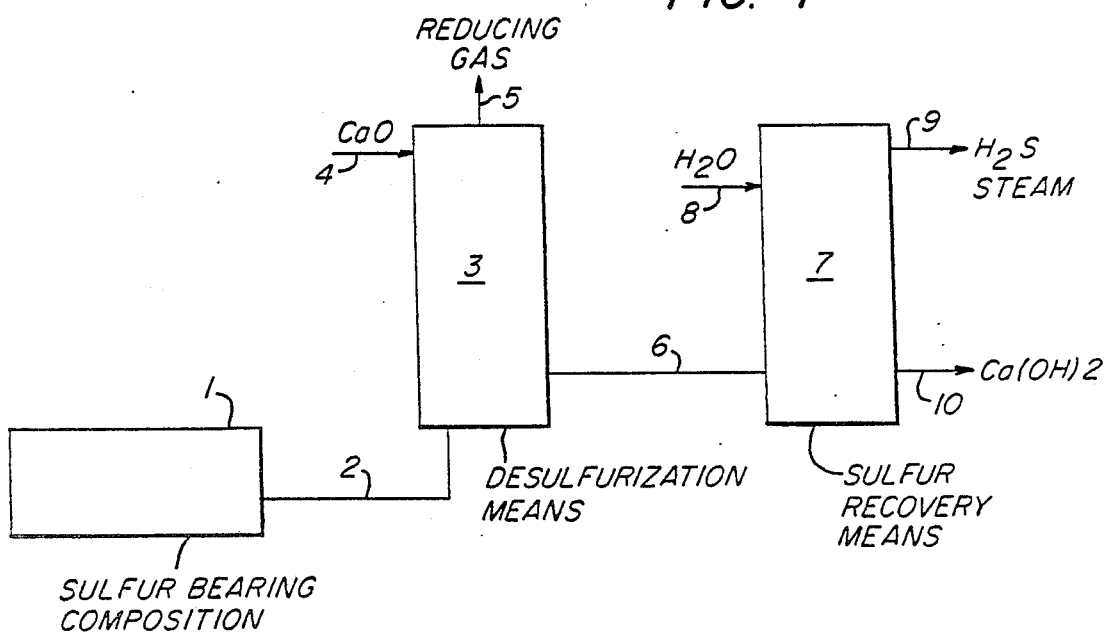
FIG. 1 is a schematic diagram of one embodiment of the desulfurization process and apparatus of this invention.

In FIG. 1 a sulfur-bearing composition such as a hot reducing gas or a particulate carbonaceous material such as finely divided coal 1 is transferred through line 2 to desulfurization means 3 where it is contacted with a particulate calcium oxide containing desulfurizing agent transported from line 4. A low-sulfur content reducing gas passes through the desulfurization means 3 to exit line 5. A calcium sulfide composition passes from the desulfurization means 3 through line 6 into sulfur recovery means 7 where it is contacted with hot liquid water at a temperature and corresponding pressure sufficient to maintain steam in the system. Water enters the sulfur recovery means 7 through line 8. Hydrogen sulfide and steam pass through exit line 9 from the sulfur recovery means 7. A calcium hydroxide containing composition passes through exit line 10 from sulfur recovery means 7.

Calcium sulfide hydrolyses in water or water vapor to calcium hydroxide, Ca(OH)$_2$, with the evolution of H$_2$S. The reaction is represented by the equation

$$CaS(s) + 2H_2O(g) = Ca(OH)_2(s) + H_2S(g)$$

where (s) and (g) indicate solid and gaseous phases. The MgO in spend dolomite will also react with water vapor forming Mg(OH)$_2$

$$MgO(s) + H_2O(g) = Mg(OH)_2(s)$$

For saturated steam, or wet steam, i.e. the water vapor saturated with water, the temperature and pressure are related in accord with the thermodynamics of steam co-existing with water. For example, at 100° C. the pressure is 1 atm and at 350° C. the pressure is 163.6 atm.

From the thermodynamic data it is possible to calculate the minimum quantity of steam required per mole of CaS(MgO) treated under equilibrium conditions to form one mole of Ca(OH)$_2$, Mg(OH)$_2$ and H$_2$S. As is seen from the calculated data given below, the equilibrium moles of water required for the treatment of one mole of CaS(MgO) is essentially independent of temperature or pressure for saturated steam.

| Temperature (°C.) | Wet Steam Pressure (atm) | Equilibrium H$_2$S pressure, atm | Moles of H$_2$O per mole of CaS (Mgo) |
|---|---|---|---|
| 100 | 1.0 | 0.053 | 21.7 |
| 150 | 4.7 | 0.25 | 21.8 |
| 200 | 15.3 | 0.81 | 21.9 |
| 250 | 39.2 | 2.00 | 22.6 |
| 300 | 84.7 | 4.32 | 22.7 |
| 350 | 163.6 | 8.27 | 22.8 |

It should be noted that the critical point for water-steam coexistence is 394° C. and 218 atm. Because the steam consumption is not a function of temperature (or the equivalent pressure), the leaching temperature and the corresponding pressure need not by any higher than necessary, as determined by the rate of reaction.

According to the present invention, the sulfided dolomite from a coal gasification plant be treated with wet stream at any desired temperature, preferably in the range 150° to 250° C. at the corresponding steam pressure of 5 to 40 atm, to generate hydrogen sulfide and form the hydroxides of calcium and magnesium. The outgoing gas consisting of a mixture of hydrogen sulfide and water vapor, is passed through a series of condensers to remove water. Essentially pure H$_2$S thus produced can be readily converted to elemental sulfur by the Claus process or can be bottled in gas cylinders as a saleable product.

EXAMPLES

Figure 2:
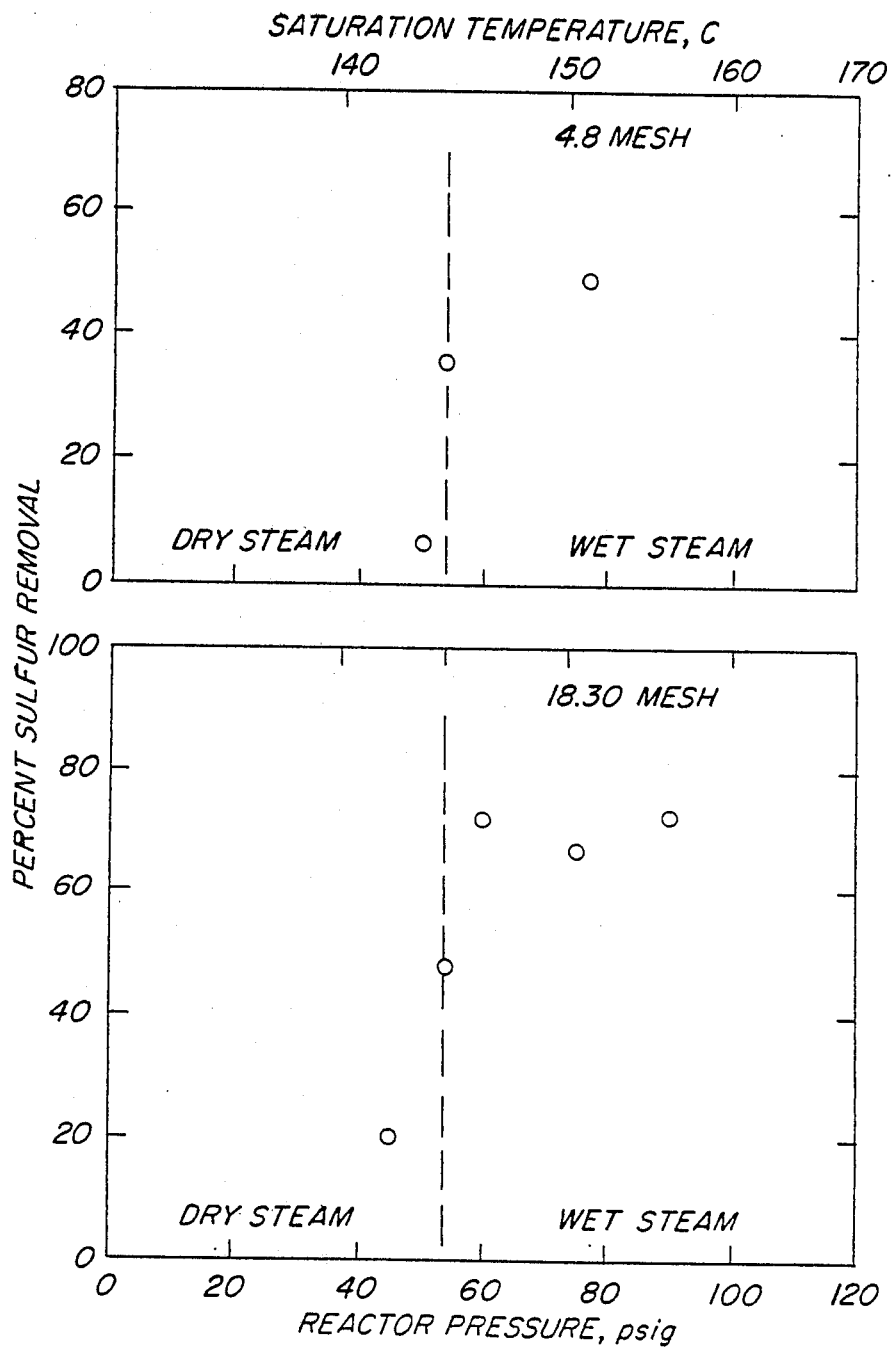

The practical viability of the present invention has been tested experimentally. The Cedarville dolomite and Molar dolomite, crushed and sieved to size ranges, ⅜ inch, 4–8 mesh, 18–30 mesh and 30–60 mesh, were first sulfided in a H$_2$S - H$_2$ mixture. The sulfur content of the various batches of material was between 27 and 28.5 percent; the latter is the stoichiometric quantity of sulfur as CaS in completely spent dolomite. In one series of experiments the sulfided dolomite sample, contained in a metal screen, was suspended in a stream of dry or wet steam. The dryness or wetness of the steam was adjusted by controlling the temperature of the reactor with respect to the temperature of the saturated steam generator. When the reactor temperature is lower than the saturation temperature, there is condensation of water in the reactor and on the sample, hence the leaching is done in wet steam. The exhaust gas was cooled to condense the water vapor then passed through a solution of lead acetate to precipitate the sulfur so that the amount of H$_2$S evolved could be measured. Examples of the results are given in FIG. 2 for leaching of spent Cedarville dolomite for 1 hour, at 150° C. and indicated pressures with dry and wet steam. An important discovery was that the leaching in wet steam was much more efficient than in dry steam, and the small particles leached faster than large particles.

Figure 3:
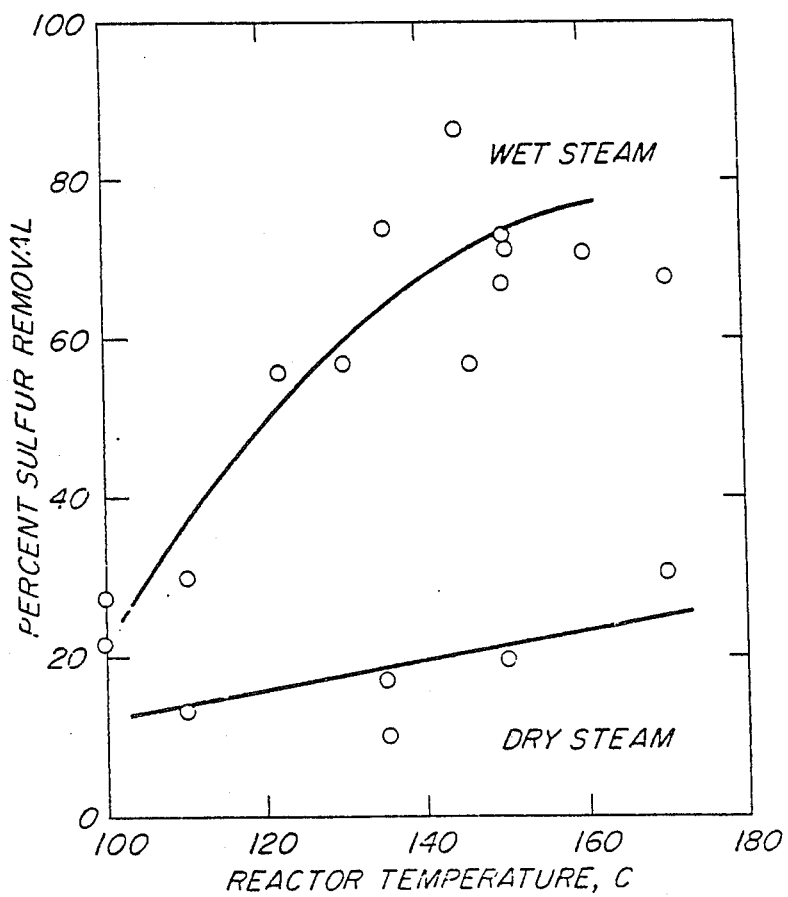
FIGS. 2-3 are graphs showing some of the results of the examples.

The results in FIG. 3 show the effect of temperature on the extent of leaching of spent dolomite in dry and wet steam in 1 hour. At all temperatures the wet steam is more effective than dry steam.

In the light of these findings, a series of experiments were made with boiling water. The sample was submerged in boiling water and H$_2$S evolved was measured by the usual analytical techniques. The leaching was done at temperatures of 100° C. to 150° C. and the corresponding saturation pressures of 1 to 4.7 atm. Typical experimental results given below show the effect of reactor temperature on the extent of leaching in boiling water after 90 minutes reaction of 18–30 mesh sulfided dolomite.

| Temperature °C. | Percent Sulfur Removed |
|---|---|
| 100 | 90.5 |
| 130 | 95.3 |
| 150 | 96.7 |
| 170 | 96.8 |

The comparison of these results with the data in FIG. 3 for wet steam show that the extent of sulfur removal, i.e. leaching, is much greater when the leaching is done by submerging the sulfided dolomite in water, instead of using wet steam. The presence of water evidently facilitates the rate of leaching with steam.

The results below show the effect of particle size on the extent of leaching in boiling water at 150° C. and 4.7 atm in 90 minutes reaction time.

| Size of sulfided dolomite | Percent Sulfur Removed |
|---|---|
| ⅜ inch | 41.6 |
| 4–8 mesh | 91.6 |
| 18–30 mesh | 96.7 |
| 30–60 mesh | 98.1 |

The solubility of Ca(OH)$_2$ in water is 770 ppm at 100° C., while that of Mg(OH)$_2$ is 4 ppm. This difference in the water solubility of the reaction products is responsible for disintegration of the sulfided dolomite during leaching. The mechanical stirring of the slurry during leaching will also facilitate particle disintegration and further enhance the rate of sulfur removal. A final observation to be reported concerns the odor of the treated material as determined by the human nose, a very sensitive detector of H$_2$S. The leached materials with more than 96 percent sulfur removal were essentially odorless, even when wet, indicating the absence of calcium sulfide. Evidently some oxidation occurred during leaching and the residual sulfur, about 2 to 4 percent of the initial amount, is in the form of calcium sulfite and sulfate, the presence of which does not create a pollution problem upon disposal of the material.

The solids byproduct of the leach is an intimate mixture of Ca(OH)$_2$ and Mg(OH)$_2$ containing trace amount of sulfur (0.5% S). This byproduct may be used (i) to remove SO$_2$ from power plant stack gases, (ii) as a fertilizer, or (iii) for other applications in the chemical industry. If the byproduct is not marketable, it can be disposed of without any concern of environmental pollution.

In one embodiment of this invention the desulfurization means 3 of FIG. 1 is a shaft reduction furnace. In this embodiment ore, such as iron oxide, preferably in the form of pellets, is added to the shaft furnace. If finely divided sulfur-bearing carbonaceous material is added to the shaft furnace, then this material is gasified in the lower part of the shaft furnace thereby forming reducing gas. The sulfur from the carbonaceous material is evolved as $H_2S$ which is then removed by reaction with the desulfurizing agent present in the furnace.

In this shaft furnace embodiment of this invention reduced iron oxide pellets containing some residual iron oxide is discharged at the bottom of the shaft furnace after being cooled to room temperature. The discharged mass contains unused char from the carbonaceous material and ash from the carbonaceous material mixed with calcium oxide and calcium sulfide. The reduced pellets are separated from the discharged mass, for example, by a magnet. The spent calcium oxide desulfurizing agent may be treated with wet steam, as described herein, and all the sulfur collected as $H_2S$. Depending on the economical feasibility one of the following three processing routes may be adopted.

1. Treatment for disposal only—The spent material is treated with wet steam or boiling water as described herein. $H_2S$ is collected and the reaction product calcium hydroxide, mixed with coal ash and coal char is dumped. If there is sufficient quantity of coal char in the waste, the coal char may be separated from the sludge by flotation either during or after the wet-steam treatment.

2. Treatment for recycle—In order to recycle the wet-steam treated waste, the material is consolidated to a hard mass. This is achieved by treatment of the sludge with carbon dioxide. One method of continuous processing is as follows. The filtered sludge is fed continuously with a conveyor belt into a muffle furnace in which the carbon dioxide gas is flowing at a temperature of between about 200° and about 500° C. The furnace off-gas may be burnt in the muffle furnace to generate heat and $CO_2$ atmosphere in the furnace for the carbonating treatment. Under these conditions, the water in the sludge will evaporate and calcium hydroxide be converted to calcium carbonate that is intimately mixed with the ash from the carbonaceous material ash which is an inert material under these conditions. The consolidated hardened mass containing entrapped carbonaceous material char is then crushed to the required size range and recycled back to the shaft furnace. Because of intimate contact with calcium carbonate, the char in this recycled material will gasify more readily during descent in the shaft furnace, hence improving the efficiency of ore reduction. Also, because of intimate mixing of the ash with the regenerated calcium carbonate in the recycled material, upon calcination in the shaft furnace, the lime will have a greater porosity. Hence, it will react more readily with $H_2S$ evolved during the in situ gasification of coal in the shaft furnace. However, because of buildup of the ash, the material has to be dumped after a few repeated recycles.

3. Treatment for partial recycle—The same as in 2, above, but a portion, equivalent to the pickup of ash, is dumped and the remainder is recycled to the shaft furnace together with some fresh limestone. This mode of operation may be more appropriate for a continuous operation of the process.

I claim:

1. A process for reducing ore comprising (a) contacting a sulfur bearing hot reducing gas or carbonaceous material with a desulfurizing agent comprising a bed of solid particles comprising calcium oxide and ore to thereby produce a low-sulfur content hot reducing gas stream which reduces the ore, a reduced ore, and a calcium sulfide composition, (b) separating the reduced ore from the other products of step (a), and then (c) contacting said calcium sulfide composition with hot liquid water at a temperature and corresponding pressure sufficient to maintain steam in the system and wherein a major portion of said calcium sulfide composition has a particle size of less than about 6 mesh to thereby convert the sulfide of said composition to calcium hydroxide and hydrogen sulfide.

2. Process as in claim 1 wherein said ore is pelletized iron ore.

3. Process as in claim 2 wherein the material contacted with said desulfurizing agent is said carbonaceous material, and wherein said carbonaceous material is finely divided coal and wherein step (a) is performed in a shaft furnace.

4. Process as in claim 3 wherein the temperature of step (a) is between about 800° to 900° C., and wherein step (c) is continued until the conversion of said sulfide to said calcium hydroxide.

5. Process as in claim 3 wherein said hot liquid water is wet steam or boiling water.

6. Process as in claim 3 wherein said desulfurizing agent comprises calcined dolomite or lime.

7. Process as in claim 3 wherein said desulfurizing agent in step (a) has a particle size of between about ¼ inch and about ½ inch.

8. Process as in claim 7 wherein substantially all of said desulfurizing agent is reduced in size under water after step (a) and prior to step (b).

9. Process as in claim 3 wherein the calcium hydroxide composition produced in step (c) is contacted with carbon dioxide to thereby produce calcium carbonate.

10. Process as in claim 9 wherein the calcium carbonate composition is recycled in the shaft furnace.

11. Process as in claim 10 wherein fresh desulfurizing agent is added to that desulfurizing agent which is recycled.

12. Process as in claim 11 wherein a portion of the calcium carbonate material is discarded and a portion is recycled to said shaft furnace.

* * * * *